Dec. 24, 1940.  W. J. MORGAN  2,226,067
PIPE JOINT
Filed Aug. 31, 1938  5 Sheets-Sheet 2
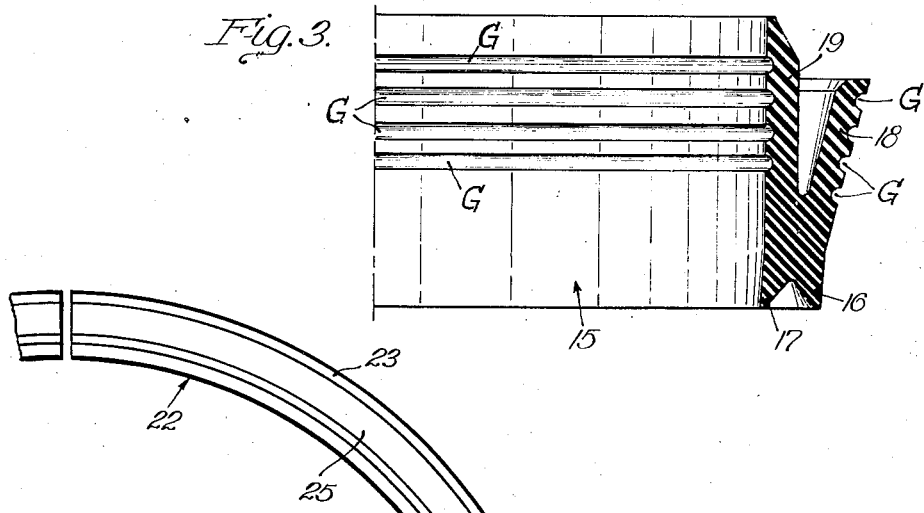
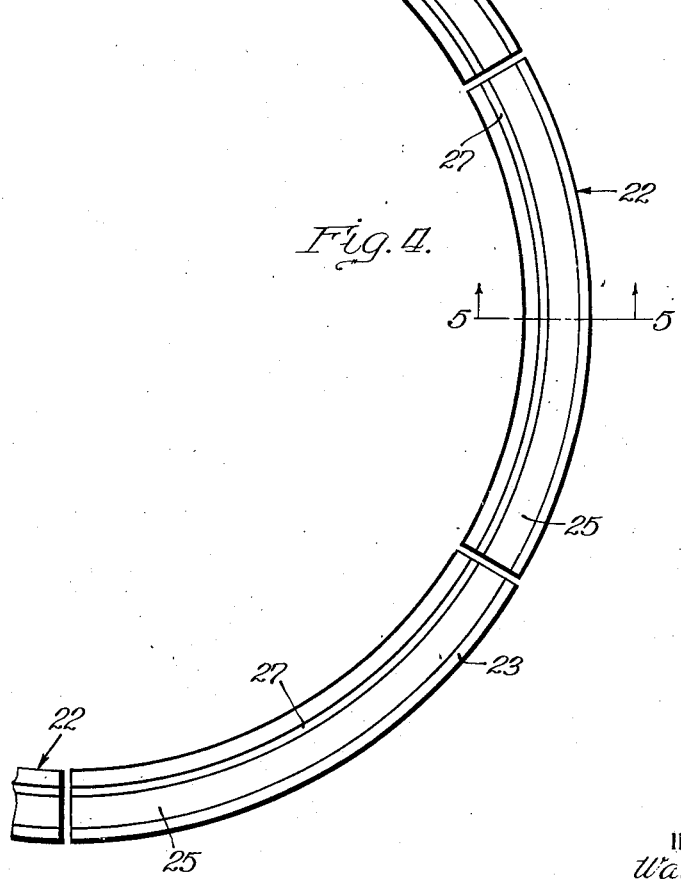
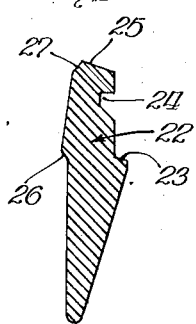
INVENTOR
Walter J. Morgan
BY
ATTORNEY Dec. 24, 1940.     W. J. MORGAN     2,226,067
PIPE JOINT
Filed Aug. 31, 1938     5 Sheets-Sheet 3

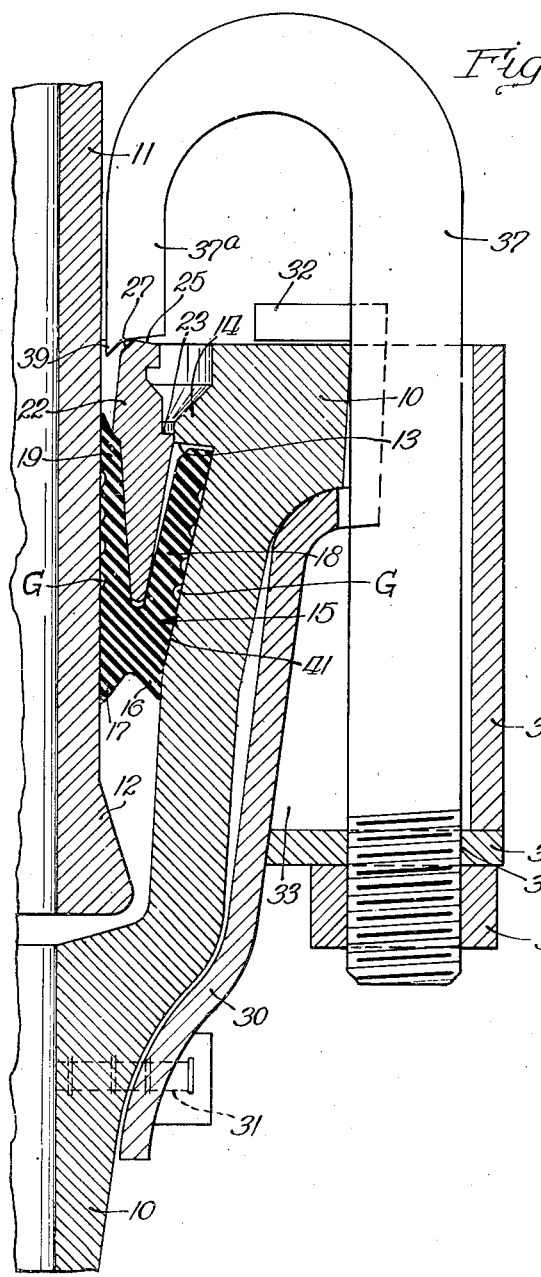

INVENTOR
Walter J. Morgan
BY
ATTORNEY

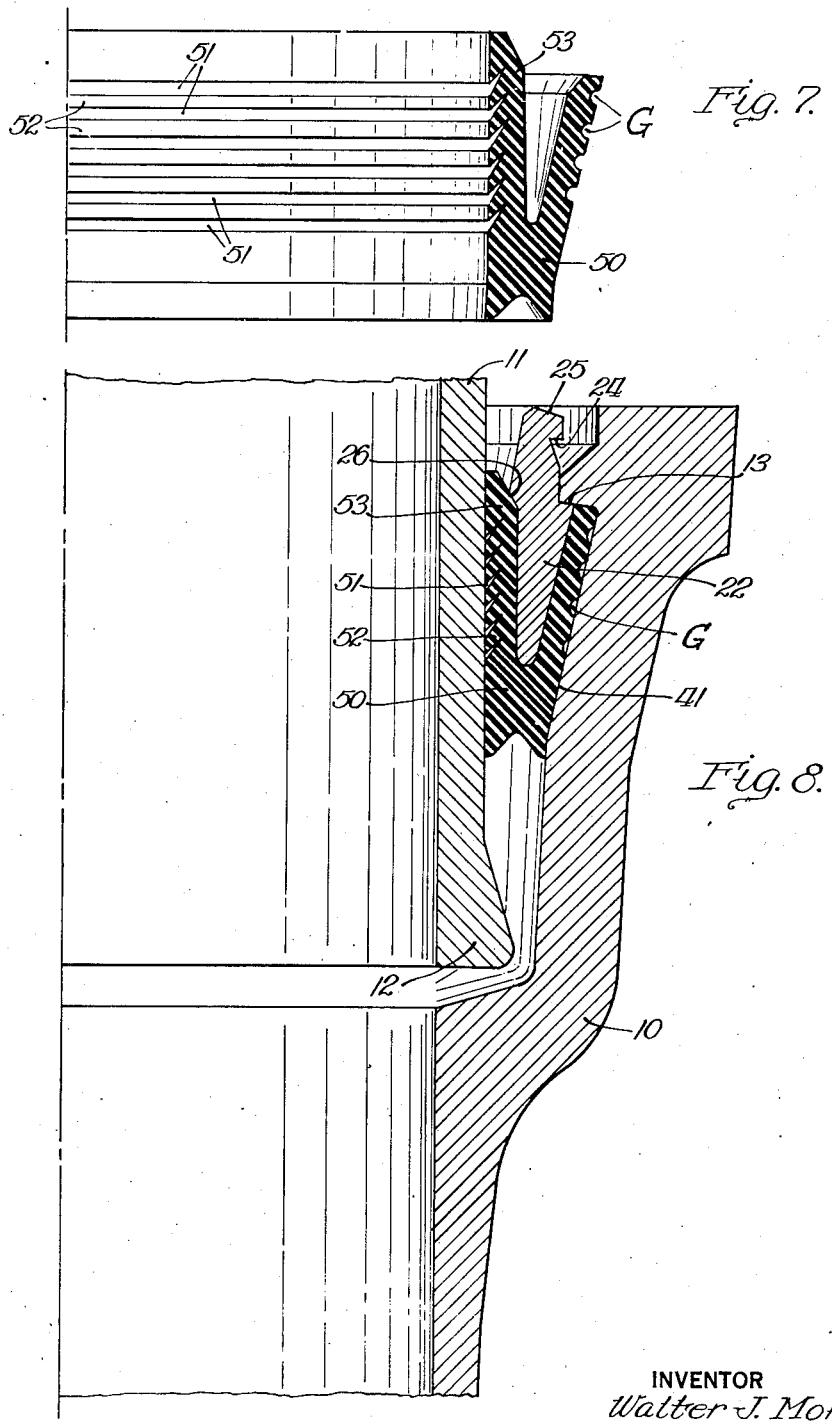

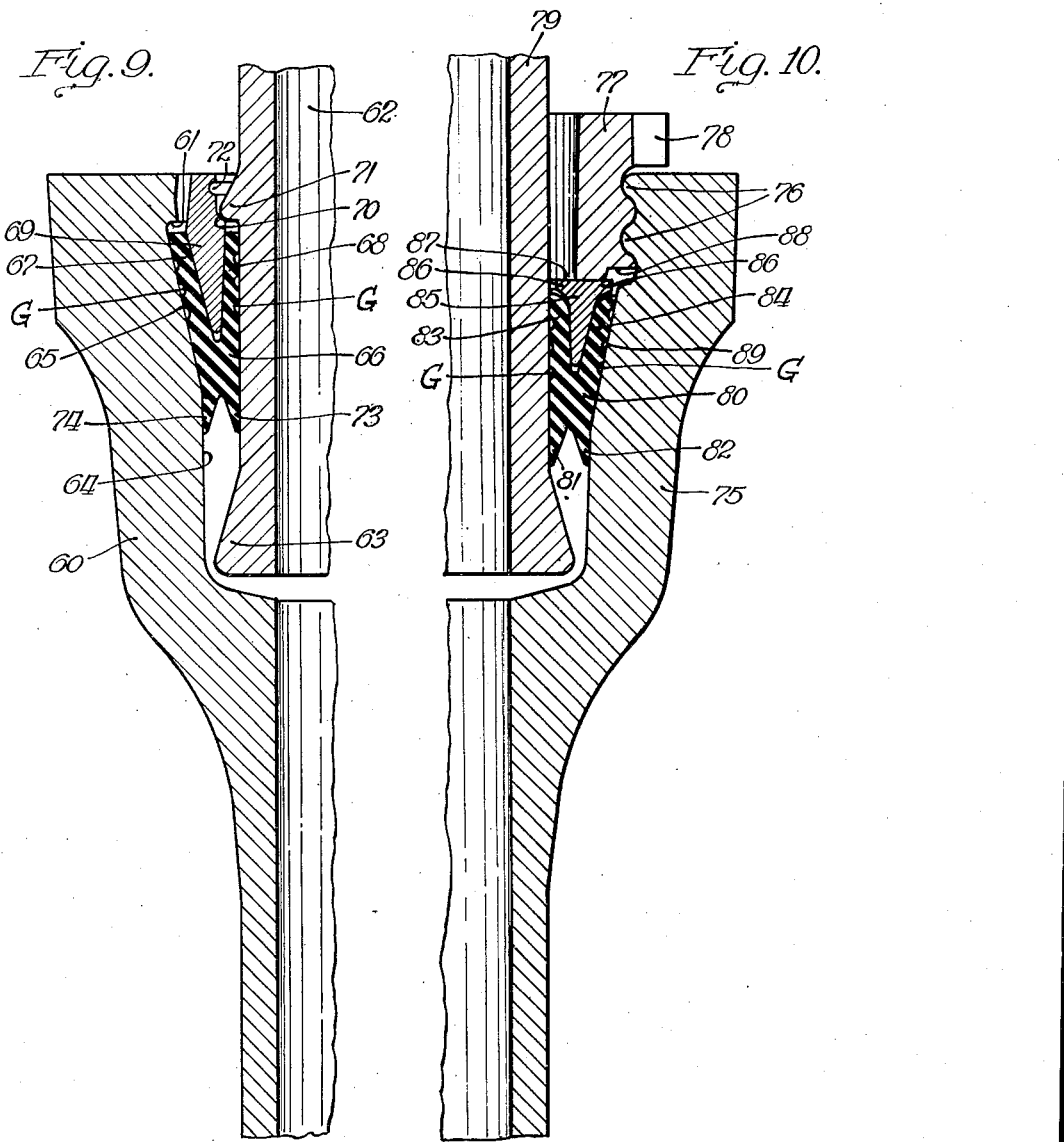

Patented Dec. 24, 1940

2,226,067

UNITED STATES PATENT OFFICE 2,226,067

PIPE JOINT

Walter J. Morgan, Birmingham, Ala., assignor to American Cast Iron Pipe Company, Birmingham, Ala., a corporation of Georgia Application August 31, 1938, Serial No. 227,841

3 Claims. (Cl. 285—115)

This invention relates to pipe joints, especially cast iron pipe joints, and among other objects, aims to provide a pipe joint which may withstand high pressures without leakage, over a long period of time; which employs no bolts and nuts subject to corrosion; which permits both deflection and longitudinal movement without leakage; which is easily made in the field and is also disassembled with comparative ease. The invention has other objects and advantages which will be explained in the following description of several embodiments, and of the preferred means for making and disassembling the joint.

In the accompanying drawings forming a part of this specification—

Fig. 1 is a fragmentary longitudinal section of the pipe joint, shown before it is completed with the aid of the preferred tool, which is shown in elevation and section;

Fig. 2 is a similar view of the pipe joint, but showing the complete pipe joint per se;

Fig. 3 is a quarter section of one form of gasket which may be used in the joint;

Fig. 4 is an end elevation of approximately one-half of the assembly or aggregation of wedges used in the joint;

Fig. 5 is cross section on the line 5—5 of Fig. 4;

Fig. 7 is a quarter section of a modified form of gasket;

Fig. 8 is a quarter section of a joint employing the gasket of Fig. 7, the joint being complete except for the weatherproofing;

Fig. 9 is a fragmentary longitudinal section of still another form of joint embodying the invention;

Fig. 10 is a view like Fig. 9 but showing another modification of the joint, employing a screw gland engaging the bell.

Figure 6:
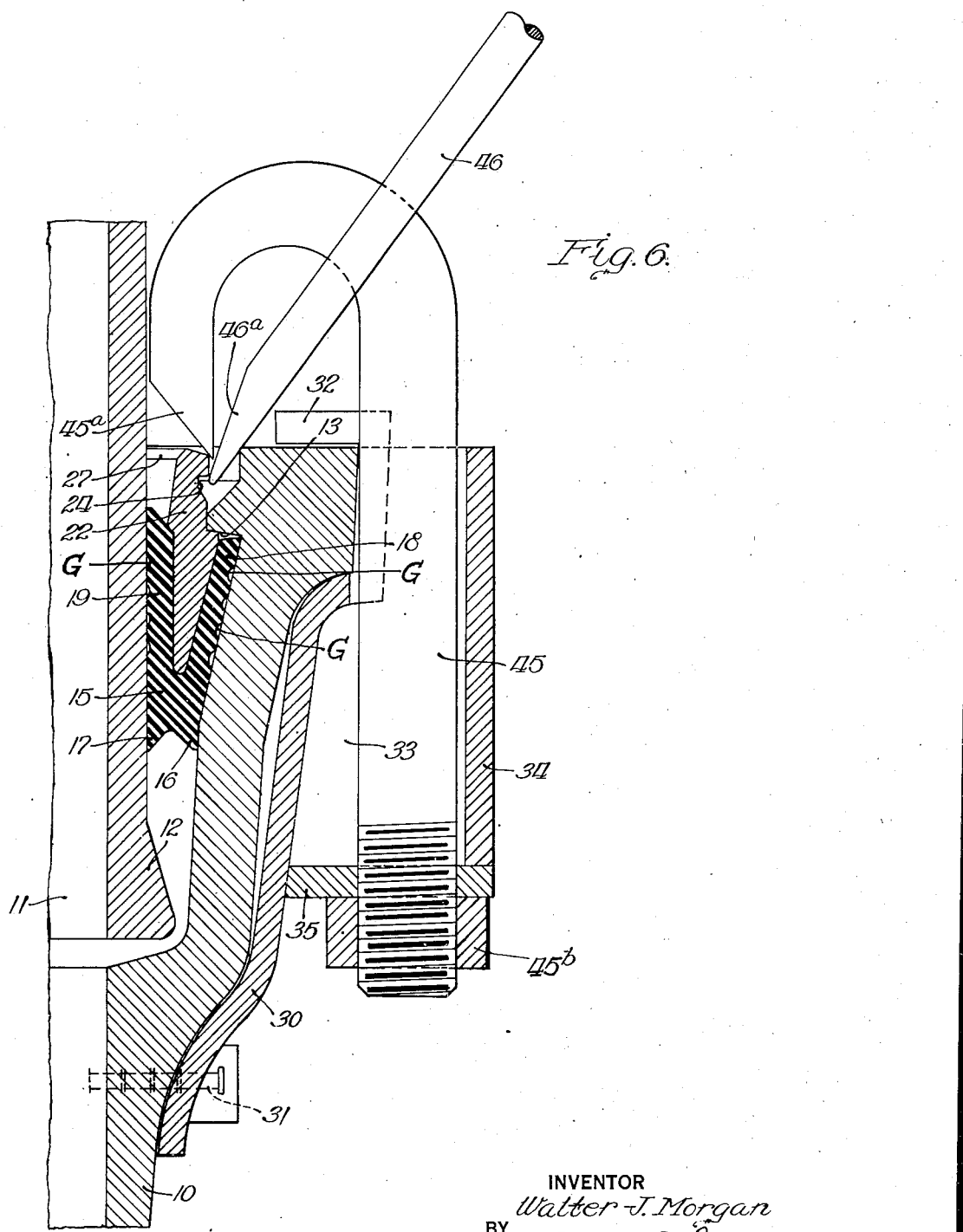
Fig. 6 is a view like Fig. 1 but showing the preferred tools in the act of disassembling the joint.

Referring particularly to the drawings, and first to Figs. 1-5 inclusive, there is shown a cast iron pipe joint comprising a bell 10 and a spigot 11, the spigot being of standard construction, with an end bead 12 as is preferred to obviate breakage arising from rough handling of the pipe, to approximately center the spigot in the bell and to resist separation, as will be described below. However, the end of the spigot may be perfectly plain, that is, having no bead, as will be understood without illustration. The bell 10 is practically of standard design except for a wide, annular shoulder 13 on an internal flange 14, the shoulder being near the mouth of the bell and preferably being substantially radial, i. e., lying in a plane at right angles to the longitudinal axis of the pipe. The inside diameter of the flange 14 is such as to pass the end bead 12 and provide a clearance for introduction of joint materials, to be described, into the space between the bell and the spigot.

The sealing member is a gasket 15 (best shown in Fig. 3), preferably a solid rubber or rubber and fabric ring, having a pair of flexible, annular, diverging pointed wings 16, 17 at the inner end, i. e., the end designed to be introduced first into the joint, and another pair of annular diverging wings 18, 19 at the opposite or outer end, the wings 18, 19 being preferably much longer than wings 16, 17, and the outer wing 18 being shorter than inner wing 19. Preferably the outer surface of wing 18 and the outer surface of wing 19 are grooved or fluted as shown at G, the grooves being preferably circular and regularly spaced, as shown; however, the grooves may be omitted with satisfactory results. The wings 18, 19 are preferably divergent, as shown, to facilitate insertion of a wedge or series of wedges into the space between them (as will be described) and also to fit better into the space behind the shoulder 13, as illustrated in Figs. 1 and 2.

The inner wings or tips 16, 17, being directly exposed to the fluid (not shown) transported by the pipe line, may be reinforced and protected against oxidation or other chemical action of the fluid, as by cotton fabric or an asbestos composition, or may be made of a special synthetic rubber such as "Neoprene," "Duprene" or "Thiokol." Whatever the material or materials employed, the inner wings 16, 17 should be somewhat flexible, and may be quite flexible and should be initially divergent and separated, as shown, when the spigot is centered in the bell, so that the pressure of the fluid in the pipe increases the sealing effect, by its outward thrust on each wing 16, 17 respectively against the bell and spigot. Thus wings 16, 17 provide a primary or inner seal which is made more effective as the fluid pressure increases.

To lock the gasket when in position, so that the greater the pressure, the greater the resistance to shifting and blowing out (up to the point of failure) and to expand or force the gasket both outwardly and inwardly against the bell and spigot, a single annular wedge or a series of wedges 22 (as illustrated) are provided, the arrangement being such that the wedge or wedges are finally locked between shoulder 13 and the gasket, entering the re-entrant portion of the gasket, i. e., the space between the wings 18, 19. If a single wedge is used, it will preferably be an annulus split at one point so it may be slipped laterally over the spigot, and in cross section it will be as shown in Fig. 5.

Preferably the wedges 22 are of hardwood or metal or some other incompressible, unbendable material, and preferably the wedges are each segments of an annulus each being curved laterally and tapering longitudinally, as shown in Figs. 4 and 5. Each wedge 22 is preferably thinnest at its inner end, and thickest at an intermediate point, where a substantially straight locking shoulder 23 is provided on the side toward the bell. A groove 24 is outside of shoulder 23 and at the outer end, the wedge has a flat end surface 25. Each wedge has a sloping shoulder 26 which is on the opposite side from the straight shoulder 23 and about as far removed from either end, and there is a beveled surface 27 adjacent the end surface 25. The wedges are designed to enter the space between wings 18, 19, to spread and hold said wings very tightly against the walls of the spigot and bell.

To make the joint, a tool is used which may be the one partly illustrated in Fig. 1, although other appliances could be used with satisfactory results. A harness 30 which may be of sheet metal and of one or more parts, is shaped to fit over the outside of the bell, conforming rather closely to the surface thereof, so that when a tie or chain 31 is used to hold the harness on the bell, the harness cannot slip or move in the direction of the bell mouth. Movement in the opposite direction is prevented by the engagement of one or more arms 32 integral with the harness and hooking over the end of the bell. One or more radial flanges 33, which may be integral with or welded to the harness 30, have webs 34 and provide an abutment for a collar 35, which has threaded bores 36, for one or more J-bolts 37, each J-bolt having a nut 38.

Tightening of nut 38 will obviously force the reduced ends 37a of J-bolts 37 toward the opening in the bell, and if the gasket and ring of wedges have first been placed in the joint space, the ends 37a will engage the end faces 25 of wedges 22 and will thrust them between the wings 18, 19 of the gasket. As the wedge shoulders 23 are moved past the flange 14 on the bell, the wedges 22 will be forced laterally toward the spigot and will considerably compress the wing 19, as shown in Fig. 1. The beveled surfaces 27 on the wedges will ultimately engage lips 39 projecting from the ends 37a and thus the wedges are held in proper position, the lips 39 making it impossible to force the ends of the wedges against the spigot with consequent distortion of the gasket and improper engagement of shoulders 23 and 13. The lips 39 also tend to lift the wedges forward into the gasket. When the shoulder of the wedge clears shoulder 13, this very considerable compression of wing 19 will be relieved to some extent, and the wedge will move outwardly with a sort of snap action until its shoulder engages shoulder 13, as illustrated in Fig. 2. When the wedges are being forced into the re-entrant portion of the gasket, they will separate the flexible wings 18, 19 laterally, or in effect will expand the gasket, to compress it against the surfaces of the bell and spigot. The reaction of the compressed gasket holds the wedges very securely against the shoulder 13, and the unyielding wedges obviously maintain the compression permanently and hence maintain the sealing effect of the outer portion of the gasket. The wings 18, 19 form a secondary seal which is effective independent of the primary or inner seal already described. The shoulder 26 on each wedge will hold the wing 19 pressed against the spigot to help maintain a seal in the extreme outer portion of the joint. The shoulders 26 also partly cover the wings 19, thus protecting said wings, and restricting the cold flowing of the gasket; and by maintaining a pressure against the spigot shoulders 26 serve to increase the resistance to endwise movement of the spigot relative to the bell.

Obviously only a single J-bolt is needed for driving each wedge into its final, locked position, and hence only one J-bolt may be provided; the harness being turned on the outside of the bell after one wedge is positioned, and then tightened when the J-bolt is engaged with the next wedge. However, there may be as many J-bolts as there are wedges 22. The reaction from tightening the J-bolt is taken care of by the close fit of the harness on the outside of the bell.

To protect the joint and weatherproof it, a gasket 40 (Fig. 2) of cementitious material may be driven or poured into the space outside of the positioned wedges 22 but within the bell. Such a gasket will also seal the joint against the destructive effects of corrosive soils. Instead of cementitious material, lead, an asphalt base product, such as "Tuflex," or mortar or other material may be used. Obviously if the joint is ever to be disassembled, the outer gasket or layer 40 of weatherproofing is easily removed. It will be understood that a protective, weatherproofing gasket or layer is not an indispensable part of the joint, as the materials thereof are practically indestructible, once the joint is properly made.

The complete joint of Fig. 2 may resist high fluid pressures in the pipe line, because of the employment of a flexible gasket which tends to form a tighter seal with increase in said pressures, and because of positive gasket-locking means, viz., the wedges and the shoulder 13, outward displacement of the gasket is practically impossible, any slight outward displacement merely serving to increase the sealing effect. Longitudinal movement of the pipe lengths may take place without affecting the seal, because as the bead 12 reaches the gasket, the inner wing 17 is merely deflected to adjust itself to the contour of the bead, and the gasket is thrust against shoulder 13, if not already in contact therewith. Further relative movement of the pipe lengths is highly improbable, but if it takes place, additional compression of the gasket is about the only result and the parts will quickly reach a state of equilibrium, wherein continued longitudinal movement of the pipe lengths is rendered impossible. Lateral deflection of the pipe lengths also is ineffective to break the seal, because the gasket, with its hard internal core provided by the wedges, is strongly resistant to extremely heavy pressures and when there is deflection of the pipes, the gasket will expand to fill the larger space formed on one side. If the spigot has a bead, as shown, the bead will sharply limit the amount of lateral deflection permitted; but with or without a spigot bead, the described pipe joint will hold its seal when the spigot is deflected to the maximum extent possible. Inward displacement of the gasket due to relative movement of the pipe lengths is positively prevented by the inwardly tapering wall 41 on the inside of the bell, and by the wedges 22 which maintain the wings 18, 19 permanently spread apart. The sealing effect of the gasket is further enhanced by the flutes or grooves G, because the pressure per unit area of the gasket is increased due to the reduction in area in contact with the spigot or bell walls, and because the grooves serve as traps for any gas or fluid which might leak past the tips or wings 16, 17.

When the described joint is to be disassembled, after the weatherproofing 40 has been removed, or partially removed, the ends of wedges 22 will be exposed and a tool or set of tools are then employed to withdraw the wedges. The preferred tools are shown in Fig. 6, and comprise the above described harness 30 tied or otherwise secured to the outside of the bell, a J-bolt 45 having a beveled end 45a, and a pinch bar 46 whose reduced end 46a enters the space between the wedge and the bell when the wedge has been thrust inwardly toward the spigot by the beveled bolt end 45a. It will be clear that when nut 45b is tightened, the beveled bolt end 45a will first engage the outer end of the wedge, then will start to push the wedge toward the spigot, and finally will release the shoulder 23 on the wedge from the shoulder 13 on the bell, whereupon the compression of gasket 15 will cause the wedge to jump outwardly to assume approximately the position illustrated in Fig. 1. The J-bolt 45 may now be loosened and turned until its beveled end 45a is out of the way, or else the harness 30 with its J-bolt or J-bolts may be removed. The pinch bar 46 will then engage the shoulder provided by the groove 24, and with its fulcrum on the inner edge of the bell, at the mouth thereof, said pinch bar will easily lift the wedge out of the bell, without injury to the wedge. Then the gasket may be withdrawn or else its wings 18, 19 may be brought together to make possible the easy withdrawal of the spigot (carrying the gasket) from the bell.

Referring now to Figs. 7 and 8, a different form of gasket 50 is there shown combined with the previously described bell and spigot, and wedges 22, to provide a pipe joint having greater resistance to pulling out the joint. The gasket 50 is similar to gasket 15 except that on the surface which contacts with the spigot there are a plurality of annular cavities 51, preferably equally spaced apart, thus providing a series of flexible lips 52, one lip being between each pair of adjacent cavities 51. The cavities are preferably sharply V-shaped, that is, are quite narrow, thus providing lips 52 which are nearly as wide at their outer ends (which contact the spigot) as at their bases. It is also important that the several cavities be slanting, say at an angle of about 45° to the axis of the annular gasket, to provide similarly slanting lips 52. While the alternating cavities and lips are shown as extending only along the wing 53, they may extend throughout the axial length of the gasket, as will be understood without illustration. The lips 52 increase the sealing action of the gasket, because whatever fluid being conveyed by the pipe reaches the first cavity (the cavity nearest the interior of the pipe) causes the flexible lip forming one wall of said cavity to be more firmly pressed against the spigot. The other lips will act in the same way, in the event fluid under pressure reaches them. And whenever the bell and spigot tend to separate, the friction between the outer surfaces of lips 52 and the surface of the spigot causes said lips to follow the spigot and tend to "dig in." The greater the longitudinal movement of the pipe lengths relative to each other, the greater this tendency to "dig in," or in other words, the higher the pressure of the lips on the surface of the spigot, as such movement tends to roll the several lips backward, which would increase the thickness of the gasket. Thus the seal is automatically increased as the resistance to endwise movement is built up.

While the lips 52 are shown only on the inside or spigot-engaging wall of the gasket, it is within the scope of the invention to provide them also on the outside or bell-engaging wall—a variation which will be understood without illustration. The grooves G will then be omitted.

Referring now to Fig. 9, the bell 60 is shown provided with an internal, inwardly facing, annular shoulder 61 adjacent its mouth, the plane of said shoulder being approximately at right angles to the longitudinal axis of the pipe. The spigot 62 has the usual bead 63 whose outside diameter is of course less than the least diameter of shoulder 61, so that the spigot may be freely inserted into and withdrawn from the socket of the bell. Adjacent the bottom of said socket, the bell is provided with an interior wall 64 which is cylindrical or nearly so, having a diameter slightly larger than that of the bead 63, to permit slight deflection of the pipe lengths, said wall 64 merging into a flaring or frusto-conical wall 65 which extends to the shoulder 61. As shown, the walls 64 and 65 are of about equal length, but if desired, a single uniformly flaring wall may extend from the bottom of the socket to the shoulder 61, although such a construction would lack an advantage of the illustrated construction, namely, proper seating of the gasket 66 in the bell socket. Gasket 66 is generally similar to gasket 15 (except for the omission of grooves 20) and needs no additional description. It will be clear that when gasket 66 is seated in the bell, it will be behind shoulder 61, the latter thus helping to lock the gasket in the joint space.

To spread apart the outer wings 67, 68 of the gasket, thus maintaining a tight seal near the mouth of the bell, a wedge or annular series of wedges 69 are employed, said wedges being generally similar to wedges 22, being narrowest at the ends which enter the re-entrant portion of gasket 66 and widest intermediate their ends. Shoulders 70 are provided on the wedges which are similar in function to shoulders 23 of wedges 22, but which lock behind an inwardly facing shoulder provided by a rib or bead 71 integral with the spigot. Obviously the rib or bead 71 co-operates with shoulder 61 in holding the gasket securely in the joint space, and blowing out of said gasket is almost impossible. Thus the described joint may withstand rather high working pressures. The joint is assembled by a tool much like the one shown in Fig. 1 and by a similar method, the principal difference being that lip 39 on the J-bolt is omitted, since wedges 69 must move inwardly toward the spigot in order to lock behind rib 71. The outer ends of wedges 69 have grooves 72 to facilitate withdrawing them by a special tool (not shown) when the joint is to be disassembled. The general procedure will be understood from Fig. 6.

As shown, the rib or bead 71 is spaced about as far from the end of the spigot as the shoulder 61 is from the base of the bell socket, the result being that when the spigot is all the way in the socket, the rib or bead is just inside the mouth of the bell, and has its wedge-locking shoulder in or nearly in the plane of shoulder 61. The inner end of gasket 66 has diverging wings 73, 74 providing an inner seal which tightens under fluid pressure within the pipe line, as explained above in connection with the form of Figs. 1 and 2. To protect and weatherproof the joint, a sealing layer of lead, cement, etc. (not shown), may be poured into the mouth of the bell surrounding the ends of wedges 69.

Referring to Fig. 10, the bell 75 has course screw threads 76 cast or cut adjacent its mouth, and an annular screw gland 77 is similarly threaded on the outside so that it may be removably secured to the bell. A lug or lugs 78 projecting outwardly from the screw gland permit turning of the screw gland by a tool (not shown). The inside diameter of the screw gland is considerably larger than the outside diameter of spigot 79, so that deflection of the latter relative to the bell is permitted. A gasket 80 is employed having inner wings 81, 82 providing an inner seal tightened by fluid pressure, and with outer divergent wings 83, 84 providing a re-entrant portion for receiving a wedge 85 or a series of wedges. The wedge 85 is generally tapering in cross section with its larger end sufficiently wide to provide two arms 86 which engage the outer edges of wings 83, 84 to hold the gasket securely in the joint space. Thus the wedge 85 is more or less T-shaped, and has a relatively wide outer face 87 with which the inner end of the screw gland 77 engages when the screw gland is in place. It will be clear that the screw gland offers a high mechanical advantage and hence may be used to assemble the wedge or wedges 85 in the joint, as well as permanently to hold the wedges and the gasket in joint-sealing positions. The screw gland should be of cast iron, like the pipe lengths, to insure a life equal to that of the pipe. To prevent the screw gland from "bottoming" in the threaded bell, it is cut away as at 88. Thus the wedge or wedges 85 are thrust home by the screw gland to the maximum extent permitted by the construction and there is no binding of the screw gland before the wedges are fully inserted in the gasket. The interior of the bell preferably has a frusto-conical wall 89 for seating the gasket. It will be clear that the screw gland provides, in effect, an adjustable gasket and wedge locking means which is attached to and forms an extension of the bell.

All the described forms of the invention are alike in providing means engageable with the bell or the spigot (or both) for holding a gasket securely in the joint space, also for expanding said gasket to form a very tight seal, which nevertheless permits both deflection and longitudinal movement.

This application is generic to and a companion to an application filed by me on the same date, Serial No. 227,842, covering specifically other improvements in pipe joints which generically are like the pipe joints of the present application.

Obviously the present invention may be embodied in various forms neither described nor shown. Moreover, it is not indispensable that all the features of the invention be used conjointly since they may be employed advantageously in various combinations and sub-combinations.

Having fully described four embodiments of the invention, what I claim as new and desire to secure by Letters Patent is:

1. A pipe joint comprising, in combination, a bell and spigot; a flexible annular gasket in the joint space; said gasket having an annular re-entrant portion; a wedge forced into the re-entrant portion of the gasket to compress the same against the bell and spigot, said wedge being unyieldable and having an outer end shaped to facilitate driving or forcing the wedge inwardly and also shaped to facilitate withdrawing the wedge from the joint space; and means engaging the wedge within the bell and locking the wedge in gasket-compressing position.

2. A pipe joint comprising, in combination, a bell and spigot; an annular shoulder inside the bell near its mouth; a resilient sealing gasket in the joint space and having two divergent annular wings at its inner end, the outer surfaces of said wings being in sealing contact with the outer wall of the spigot and the inner wall of the bell, respectively; said gasket also having two spaced annular wings at its outer end; an annular series of unyielding wedges forced into the space between the two wings at the outer end of the gasket; said wedges having shoulders near the outer ends thereof, said shoulders locking behind the shoulder on the bell under the reaction of the resilient sealing gasket; the gasket being compressed against the walls of the spigot and bell by the thrust of the wedges.

3. A bell and spigot pipe joint characterized by the employment of a compressible gasket in the joint space, a shoulder on either the bell or the spigot extending into the joint space, and a wedge adapted to enter said joint space to compress said gasket; said wedge being unyieldable and having a shoulder which locks behind said shoulder after said wedge has entered the joint space a certain distance; the elasticity of the gasket effecting said locking automatically.

WALTER J. MORGAN.